United States Patent
Smith et al.

(10) Patent No.: US 8,976,224 B2
(45) Date of Patent: Mar. 10, 2015

(54) CONTROLLED THREE-DIMENSIONAL COMMUNICATION ENDPOINT

(71) Applicant: Microsoft Corporation, Redmond, WA (US)

(72) Inventors: Yancey Christopher Smith, Kirkland, WA (US); Eric G. Lang, Yarrow Point, WA (US); Christian F. Huitema, Clyde Hill, WA (US); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 13/648,888

(22) Filed: Oct. 10, 2012

(65) Prior Publication Data
US 2014/0098183 A1    Apr. 10, 2014

(51) Int. Cl.
*H04N 7/14*  (2006.01)
*H04N 7/15*  (2006.01)
*H04N 13/02*  (2006.01)

(52) U.S. Cl.
CPC ........... *H04N 7/157* (2013.01); *H04N 13/0242* (2013.01); *H04N 13/0253* (2013.01); *H04N 13/0278* (2013.01); *H04N 2213/003* (2013.01)
USPC ...................................... 348/14.09; 370/260

(58) Field of Classification Search
CPC .............................. H04L 12/1813; H04N 7/15
USPC .............................. 348/14.08, 14.16; 370/260
See application file for complete search history.

(56) References Cited

U.S. PATENT DOCUMENTS

| | | | |
|---|---|---|---|
| 6,072,496 A | 6/2000 | Guenter |
| 6,226,003 B1 | 5/2001 | Akeley |
| 6,496,601 B1 | 12/2002 | Migdal |
| 6,781,591 B2 | 8/2004 | Raskar |
| 7,023,432 B2 | 4/2006 | Fletcher |

(Continued)

OTHER PUBLICATIONS

Aliaga, D. G., I. Carlbom, A spatial image hierarchy for compression in image-based-rendering, Proc. of the 2005 Int'l Conf. on Image Processing, ICIP 2005, Sep. 11-14, 2005, pp. 609-612, vol. 1, Genoa, Italy.

(Continued)

*Primary Examiner* — Creighton Smith
(74) *Attorney, Agent, or Firm* — David Andrews; Steve Wight; Micky Minhas

(57) ABSTRACT

A controlled three-dimensional (3D) communication endpoint system and method for simulating an in-person communication between participants in an online meeting or conference and providing easy scaling of a virtual environment when additional participants join. This gives the participants the illusion that the other participants are in the same room and sitting around the same table with the viewer. The controlled communication endpoint includes a plurality of camera pods that capture video of a participant from 360 degrees around the participant. The controlled communication endpoint also includes a display device configuration containing display devices placed at least 180 degrees around the participant and display the virtual environment containing geometric proxies of the other participants. Placing the participants at a round virtual table and increasing the diameter of the virtual table as additional participants are added easily achieves scalability.

20 Claims, 11 Drawing Sheets

(56) References Cited

U.S. PATENT DOCUMENTS

| | | | |
|---|---|---|---|
| 7,096,428 | B2 | 8/2006 | Foote |
| 7,106,358 | B2 | 9/2006 | Valliath |
| 7,142,209 | B2 | 11/2006 | Uyttendaele |
| 7,286,143 | B2 | 10/2007 | Kang |
| 7,551,232 | B2 | 6/2009 | Winger |
| D610,105 | S | 2/2010 | Graham |
| 7,671,893 | B2 | 3/2010 | Li |
| 7,702,016 | B2 | 4/2010 | Winder |
| 7,778,491 | B2 | 8/2010 | Steedly |
| 7,840,638 | B2 | 11/2010 | Zhang |
| 8,036,491 | B2 | 10/2011 | Matsui |
| 8,675,067 | B2 * | 3/2014 | Chou et al. .................... 348/143 |
| 2002/0196256 | A1 | 12/2002 | Hoope |
| 2003/0218672 | A1 | 11/2003 | Zhang |
| 2004/0130614 | A1 | 7/2004 | Valliath et al. |
| 2005/0017969 | A1 | 1/2005 | Sen |
| 2005/0280646 | A1 | 12/2005 | Wang |
| 2005/0285875 | A1 | 12/2005 | Kang |
| 2006/0023782 | A1 | 2/2006 | Cai |
| 2006/0028473 | A1 | 2/2006 | Uyttendaele |
| 2006/0028489 | A1 | 2/2006 | Uyttendaele |
| 2006/0158509 | A1 | 7/2006 | Kenoyer |
| 2006/0221072 | A1 | 10/2006 | Se et al. |
| 2006/0262856 | A1 | 11/2006 | Wu |
| 2007/0070177 | A1 | 3/2007 | Christensen |
| 2007/0236656 | A1 | 10/2007 | Jeong |
| 2007/0263080 | A1 | 11/2007 | Harrell |
| 2008/0088626 | A1 | 4/2008 | Habe |
| 2009/0033737 | A1* | 2/2009 | Goose et al. ............... 348/14.07 |
| 2009/0033740 | A1 | 2/2009 | Ishikawa |
| 2009/0109280 | A1 | 4/2009 | Gotsman |
| 2009/0128548 | A1 | 5/2009 | Gloudemans |
| 2010/0026712 | A1 | 2/2010 | Aliprandi |
| 2010/0080448 | A1 | 4/2010 | Tam |
| 2010/0085416 | A1 | 4/2010 | Hegde et al. |
| 2010/0158388 | A1 | 6/2010 | Bookout |
| 2010/0201681 | A1 | 8/2010 | Criminisi |
| 2010/0214391 | A1 | 8/2010 | Graham et al. |
| 2010/0225735 | A1 | 9/2010 | Shaffer |
| 2010/0238273 | A1 | 9/2010 | Luisi et al. |
| 2010/0259595 | A1 | 10/2010 | Trimeche |
| 2010/0262628 | A1 | 10/2010 | Singer |
| 2010/0265248 | A1 | 10/2010 | McCrae |
| 2010/0321378 | A1 | 12/2010 | Betzler |
| 2010/0328475 | A1 | 12/2010 | Thomas |
| 2010/0329358 | A1 | 12/2010 | Zhang |
| 2011/0032251 | A1 | 2/2011 | Pothana |
| 2011/0050859 | A1 | 3/2011 | Kimmel |
| 2011/0058021 | A1 | 3/2011 | Chen |
| 2011/0093273 | A1 | 4/2011 | Lee |
| 2011/0096832 | A1 | 4/2011 | Zhang |
| 2011/0169824 | A1 | 7/2011 | Fujinami |
| 2011/0181685 | A1 | 7/2011 | Saleh |
| 2011/0211749 | A1 | 9/2011 | Tan |
| 2012/0075303 | A1 | 3/2012 | Johnsson |
| 2012/0200676 | A1 | 8/2012 | Huitema et al. |

OTHER PUBLICATIONS

Arsenault, R., C. Ware, Frustum view angle, observer view angle and VE navigation, Proc. of the 5th Symposium on Virtual Reality, Oct. 7-10, 2002, Fortaleza, CE, Brazil.

Berger, K., K. Ruhl, Y. Schroeder, C. Bruemmer, A. Scholz, M. A. Magnor, Markerless motion capture using multiple color-depth sensors, Proc. of the Vision, Modeling, and Visualization Workshop 2011, VMV 2011, Oct. 4-6, 2011, pp. 317-324, Berlin, Germany.

Bogomjakov, A., C. Gotsmann, M. Magnor, Free-viewpoint video from depth cameras, Proc. Vision, Modeling and Visualization, Nov. 2006, pp. 89-96.

Boukerche, A., R. Jarrar, R. W. Pazzi, A novel interactive streaming protocol for image-based 3D virtual environment navigation, Proc. of IEEE Int'l Conf. on Communications, ICC 2009, Jun. 14-18, 2009, pp. 1-6, Dresden, Germany.

Carranza, J., C. Theobalt, M. A. Magnor, H.-P. Seidel, Free-viewpoint video of human actors, ACM Trans. Graph., Jul. 2003, pp. 569-577, vol. 22, No. 3.

Deering, M., Geometry compression, Proc. of the 22nd Annual Conf. on Comp. Graphics and Interactive Techniques, SIGGRAPH 1995, Aug. 6-11, 1995, pp. 13-20, Los Angeles, CA, USA.

Do, L., S. Zinger, P.H.N. de With, Quality improving techniques for free-viewpoint DIBR, 3DTV-Conference: The True Vision Capture, Transmission and Display of 3D Video, May 4-6, 2009, pp. 1-4, Potsdam, Germany.

Eisemann, M., F. Klose, M. A. Magnor, Towards plenoptic Raumzeit reconstruction, Video Processing and Computational Video—International Seminar, Oct. 10-15, 2010, pp. 1-24, Dagstuhl Castle, Germany.

Eisert, P., Virtual video conferencing using 3D model-assisted image-based rendering, The 2nd IEE European Conf. on Visual Media Production, CVMP 2005, Nov. 30-Dec. 1, 2005, pp. 185-193.

Ekmekcioglu, E., B. Gunel, M. Dissanayake, S. T. Worrall, A. M. Kondoz, A scalable multi-view audiovisual entertainment framework with content-aware distribution, 17th IEEE Intl Conf. on Image Processing, ICIP 2010, Sep. 26-29, 2010, pp. 2401-2404, Hong Kong.

Fitzgibbon, A. W., Y. Wexler, A. Zisserman, Image-based rendering using image-based priors, 9th IEEE Int'l Conf. on Comp. Vision, ICCV 2003, Oct. 14-17, 2003, pp. 1176-1183, Nice, France.

Grau, O., Multi-view 4D reconstruction of human action for entertainment applications, Research and Development White Paper, British Broadcasting Company, Nov. 2011, pp. 1-21.

Guillemaut, J.-Y., A. Hilton, Joint multi-layer segmentation and reconstruction for free-viewpoint video applications, Int'l J. of Comp. Vision, May 2011, pp. 73-100, vol. 93, No. 1.

Hornung, A., L. Kobbelt, Interactive pixel-accurate free viewpoint rendering from images with silhouette aware sampling, Comput. Graph. Forum, Dec. 2009, pp. 2090-2103, vol. 28, No. 8.

Kilner, J., J. Starck, A. Hilton, A comparative study of free-viewpoint video techniques for sports events, European Conf. on Visual Media Production, Nov. 29-30, 2006, pp. 87-96.

Kim, Y. M., D. Chan, C. Theobalt, S. Thrun, Design and calibration of a multi-view TOF sensor fusion system, IEEE Comp. Society Conf. on Comp. Vision and Pattern Recognition Workshops, CVPRW 2008, Jun. 23-28, 2008, pp. 1-7.

Kurashima, C. S., R. Yang, A. Lastra, Combining approximate geometry with view-dependent texture mapping—A hybrid approach to 3D video teleconferencing, 15th Brazilian Symposium on Comp. Graphics and Image Processing, SIBGRAPI 2002, Oct. 7-10, 2002, pp. 112-119, Fortaleza-CE, Brazil.

Kuster, C., T. Popa, C. Zach, C. Gotsman, M. H. Gross, FreeCam: A hybrid camera system for interactive free-viewpoint video, Proc. of the Vision, Modeling, and Visualization Workshop 2011, VMV 2011, Oct. 4-6, 2011, pp. 17-24, Berlin, Germany.

Lai, K.-K., Y.-L. Chan, C.-H. Fu, W.-C. Siu, Viewpoint switching in multiview videos using SP-frames, Proc. of the Int'l Conf. on Image Processing, ICIP 2008, Oct. 12-15, 2008, pp. 1776-1779, San Diego, California, USA.

Lamboray, E., S. Würmlin, M. Waschbüsch, M. H. Gross, H. Pfister, Unconstrained free-viewpoint video coding, Proc. of the 2004 Int'l Conf. on Image Processing, ICIP 2004, Oct. 24-27, 2004, pp. 3261-3264, Singapore.

Lei, C., Y.-H. Yang, Efficient geometric, photometric, and temporal calibration of an array of unsynchronized video cameras, Sixth Canadian Conf. on Comp. and Robot Vision, CRV 2009, May 25-27, 2009, pp. 162-169, Kelowna, British Columbia, Canada.

Lipski, C., C. Linz, K. Berger, A. Sellent, M. A. Magnor, Virtual video camera: Image-based viewpoint navigation through space and time, Comput. Graph. Forum, Dec. 2010, pp. 2555-2568, vol. 29, No. 8.

Liu, Y., Q. Dai, W. Xu, A point-cloud-based multiview stereo algorithm for free-viewpoint video, IEEE Trans. Vis. Comput. Graph., May/Jun. 2010, pp. 407-418, vol. 16, No. 3.

Liu, S., K. Kang, J.-P. Tarel, D. B. Cooper, Free-form object reconstruction from silhouettes, occluding edges and texture edges: A unified and robust operator based on duality, IEEE Trans. Pattern Anal. Mach. Intell., Jan. 2008, pp. 131-146, vol. 30, No. 1.

Lu, Z., Y.-W. Tai, M. Ben-Ezra, M. S. Brown, A framework for ultra high resolution 3D imaging, The Twenty-Third IEEE Conf. on

(56) References Cited

OTHER PUBLICATIONS

Comp. Vision and Pattern Recognition, CVPR 2010, Jun. 13-18, 2010, pp. 1205-1212, San Francisco, CA, USA.
Morvan, Y., D. Farin, P. De With, System architecture for free-viewpoint video and 3D-TV, IEEE Transactions on Consumer Electronics, May 2008, pp. 925-932, vol. 54, No. 2.
Nabeshima, R., M. Ueda, D. Arita, R. Taniguchi, Frame rate stabilization by variable resolution shape reconstruction for on-line free-viewpoint video generation, Proc. of the 7th Asian Conf. on Comp. Vision, Jan. 13-16, 2006, pp. 81-90, Hyderabad, India.
Piatti, D., Time-of-flight cameras: Tests, calibration and multi-frame registration for automatic 3D object reconstruction, 2011, pp. 1-10.
Shi, S., W. J. Jeon, K. Nahrstedt, R. H. Campbell, Real-time remote rendering of 3D video for mobile devices, Proc. of the 17th Int'l Conf. on Multimedia 2009, ACM Multimedia 2009, Oct. 19-24, 2009, pp. 391-400, Vancouver, British Columbia, Canada.
Smolić, A., K. Müller, P. Merkle, T. Rein, M. Kautzner, P. Eisert, T. Wiegand, Free viewpoint video extraction, representation, coding, and rendering, Proc. of the 2004 Int'l Conf. on Image Processing, ICIP 2004, Oct. 24-27, 2004, pp. 3287-3290, vol. 5, Singapore.
Smolić, A., P. Kauff, Interactive 3D video representation and coding technologies, Invited Paper, Proc. of the IEEE, Special Issue on Advances in Video Coding and Delivery, Jan. 2005, pp. 98-110, vol. 93, No. 1.
Starck, J., J. Kilner, A. Hilton, A free-viewpoint video renderer, J. Graphics, GPU, & Game Tools, 2009, pp. 57-72, vol. 14, No. 3.
Kilner, J., J. Starck, J.-Y. Guillemaut, A. Hilton, Objective quality assessment in free-viewpoint video production, Sig. Proc.: Image Comm., Jan. 2009, pp. 3-16, vol. 24, No. 1-2.
Starck, J., J. Kilner, A. Hilton, Objective quality assessment in free-viewpoint video production, 3DTV Conf., The True Vision—Capture, Transmission and Display of 3D Video, May 28-30, 2008, pp. 225-228, Istanbul, Turkey.
Theobalt, C., M. Li, M. A. Magnor, H.-P. Seidel, A flexible and versatile studio for synchronized multi-view video recording, Vision, Video, and Graphics, VVG 2003, Jul. 10-11, 2003, pp. 9-16, University of Bath, UK.
Tian, D. P.-L. Lai, P. Lopez, C. Gomila, View synthesis techniques for 3D video, Proc. of the SPIE Applications of Digital Image Processing XXXII, Sep. 2009, pp. 74430T-74430T-11, vol. 7443.
Vertegaal, R., I. Weevers, C. Sohn, C. Cheung, GAZE-2: Conveying eye contact in group video conferencing using eye-controlled camera direction, Proc. of the 2003 Conf. on Human Factors in Computing Systems, CHI 2003, Apr. 5-10, 2003, pp. 521-528, Ft. Lauderdale, Florida, USA.
Wei, X., L. Yin, Z. Zhu, Q. Ji, Avatar-mediated face tracking and lip reading for human computer interaction, Proc. of the 12th ACM Int'l Conf. on Multimedia, ACM Multimedia 2004, Oct. 10-16, 2004, pp. 500-503, New York, NY, USA.
Wikipedia, Hidden surface determination, Apr. 23, 2012, pp. 1-4.
Würmlin, S., E. Lamboray, M. Waschbüsch, M. Gross, Dynamic point samples for free-viewpoint video, Proc. of the Picture Coding Symposium, Dec. 15-17, 2004, pp. 6, San Francisco, CA.
Würmlin, S., E. Lamboray, M. Waschbüsch, P. Kaufman, A. Smolić, M. Gross, Image-space free-viewpoint video, Vision, Modeling, and Visualization, VMV 2005, Nov. 16-18, 2005, pp. 453-460, Erlangen, Germany.
Yea, S., A. Vetro, View synthesis prediction for multiview video coding, Sig. Proc.: Image Comm., Jan. 2009, pp. 89-100, vol. 24, No. 1-2.
Yea, S., A. Vetro, View synthesis prediction for rate-overhead reduction in FTV, 3DTV Conf.: The True Vision—Capture, Transmission and Display of 3D Video, May 28-30, 2008, pp. 145-148, Istanbul, Turkey.
Zhu, Y., A novel view multi-view synthesis approach for free viewpoint video, Int'l Joint Conf. on Artificial Intelligence, JCAI '09, Apr. 25-26, 2009, pp. 88-91, Hainan Island, China.
Ziegler, G., H. P. A. Lensch, M. Magnor, H.-P. Seidel, Multi-video compression in texture space using 4D SPIHT, 2004 IEEE 6th Workshop on Multimedia Signal Processing, Sep. 29-Oct. 1, 2004, pp. 39-42, MPI Informatik, Saarbrucken, Germany.
Zitnick, C. L., S. B. Kang, M. Uyttendaele, S. A. J. Winder, R. Szeliski, High-quality video view interpolation using a layered representation, ACM Trans. Graph., Aug. 2004, pp. 600-608, vol. 23, No. 3.
Morvan, Y., and C. O'Sullivan, Visual tuning of an image-based rendering algorithm, Proceedings of Eurographics, Oct. 2006, pp. 1-6, Ireland, Dublin.
Cooper, O. D., Robust generation of 3D models from video footage of urban scenes, Ph.D Thesis, University of Bristol, Mar. 2005.
Gautier, J., E. Bosc, L. Morin, Representation and coding of 3D video data, Nov. 17, 2010, pp. 1-43.
Goldlücke, B., Multi-camera reconstruction and rendering for free-viewpoint video, Ph.D. Thesis, Nov. 29, 2006, pp. 1-164, Max-Planck-Institut für Informatik.
Li, W., Free viewpoint video with image-based rendering, Ph.D Dissertation, May 2010, pp. 1-151, Arizona State University.
Pollefeys, M., D. Nistér, J.-M. Frahm, A. Akbarzadeh, P. Mordohai, B. Clipp, C. Engels, D. Gallup, S. J. Kim, P. Merrell, C. Salmi, S. N. Sinha, B. Talton, L. Wang, Q. Yang, H. Stewénius, R. Yang, G. Welch, H. Towles, Detailed real-time urban 3D reconstruction from video, Int'l J. of Comp. Vision, Jul. 2008, pp. 143-167, vol. 78, No. 2-3.
Sugden, B., M. Iwanicki, Mega meshes: Modelling, rendering and lighting a world made of 100 billion polygons, Game Developers Conf., Feb. 28-Mar. 4, 2011, pp. 1-67, San Francisco, CA.
"International Search Report & Written Opinion for PCT Patent Application No. PCT/US2013/063952", Mailed Date: Jun. 17, 2014, Filed Date: Oct. 9, 2013, 14 Pages.
Isgro et al., "Three-Dimensional Image Processing in the Future of Immersive Media", In IEEE Transactions on Circuits and Systems for Video Technology, vol. 14, Issue 3, Mar. 2004, pp. 288-303.
Kauff et al., "An Immersive 3D Video-Conferencing System Using Shared Virtual Team User Environments", In International Conference on Collaborative Virtual Environments, Sep. 30, 2002, pp. 105-112.

\* cited by examiner

CONTROLLED THREE-DIMENSIONAL COMMUNICATION ENDPOINT

BACKGROUND

Current video conferencing technology typically uses a single camera to capture RGB data (from the red, blue, and green (RGB) color model) of a local scene. This local scene typically includes the people that are participating in the video conference, called meeting participants. The data then is transmitted in real time to a remote location and then displayed to another meeting participant that is in a different location than the other meeting participant.

While advances have been made in video conferencing technology that help provide a higher definition capture, compression, and transmission, typically the experience falls short of recreating the face-to-face experience of an in-person conference. One reason for this is that the typical video conferencing experience lacks eye gaze and other correct conversational geometry. For example, typically the person being captured remotely is not looking into your eyes, as one would experience in a face-to-face conversation. Moreover, three-dimensional (3D) elements like motion parallax and image depth, as well as the freedom to change perspective in the scene are lacking because there is only a single, fixed video camera capturing the scene and the meeting participants.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the controlled three-dimensional (3D) communication endpoint system and method simulate an in-person communication between participants in an online meeting or conference. In addition, embodiments of the controlled 3D communication endpoint system and method allow easy scaling of a virtual environment containing the participants such that additional participants may be added by merely increasing the size of a virtual table contained in the virtual environment. Moreover, the controlled endpoint allows the viewer to feel as if the other participants are in the same room with him.

In particular, embodiments of the controlled 3D communication endpoint system and method use a plurality of camera pods at the endpoint to capture 3D video images of a participant. The plurality of camera pods in the controlled endpoint is arranged such that they allow for the capture of the participant from 360 degrees around the participant. From the data captured by the video a geometric proxy of the participant is created. A geometric proxy is created for each participant using RGB data and depth information from the captured video.

Scene geometry is created by embodiments of the system and method consistent with eye gaze and conversational geometry that would be present in an in-person communication. The general idea of the scene geometry is to create relative geometry between participants. The scene is aligned virtually to mimic a real-life scene as if the participants are in the same physical location and engaged in an in-person communication.

The scene geometry uses virtual boxes to have relative, consistent geometry between the participants. A meeting with two participants (or a one-to-one (1:1) scene geometry) consists of two boxes that occupy the spaces in front of the respective monitors (not shown) of the two participants. When there are three participants the scene geometry includes three virtual boxes that are placed around a virtual round table in an equidistant manner.

The scene geometry also includes a virtual camera. The virtual camera is a composition of images from two or more of the plurality of camera pods in order to obtain a camera view that is not captured by any one camera pod alone. This allows embodiments of the system and method to obtain a natural eye gaze and connection between people. Face tracking techniques can be used to improve performance by helping the virtual camera remain aligned with the eye gaze of the viewer. This means that the virtual camera remains level and aligned with the viewer's eyes both in the vertical and horizontal directions. The virtual camera interacts with the face tracking to create a virtual viewpoint that has the user looking where the user's eyes are looking. Thus, if the user is looking away then the virtual viewpoint is from the perspective of the user looking away. If the user is looking at the other participant, then the virtual viewpoint is from the perspective of the user looking at the other participant. This is done not by artificially making it look like the user is looking at the other participant, but rather by creating a virtual geometry that correctly represents where the user is looking.

The geometric proxies are rendered relative to each other and placed along with the scene geometry into a virtual environment. The rendered geometric proxies and the scene geometry are transmitted to each of the participants. The virtual environment is displayed to a viewer (who is also one of the participants) in the controlled environment of an endpoint. In particular, each endpoint contains a display device configuration that displays the virtual environment to the viewer using the virtual viewpoint. The virtual viewpoint is dependent on the position and orientation of the viewer's eyes. Depending on the position and orientation of the eyes, the viewer sees a different perspective of the other participants in the meeting as well as other aspects of the virtual environment.

Registration of the real space and the virtual space ensure that the images displayed are what the viewer would see if she were looking around the virtual environments at the other participants. In addition, face-tracking techniques can be used to track the viewer's eyes to know what the virtual viewpoint should display. In order to create realistic geometry at scale for participants in an efficient way and to help maintain the illusion that the participant are all together in one physical location, controlling the size and layout of the endpoints makes it easier to build a solution.

The display device configuration contains a plurality of display devices (such as monitors or screens). The display device configuration controls the endpoint environment such that the display devices are arranged at least at 180 degrees around the viewer. This ensures that the viewer has an immersive experience and feels as though he is actually in the same physical space as the other participants.

Embodiments of the system and method also provide for ease of scalability. In particular, the virtual table in some embodiments is a round (or circular) virtual table having a first diameter. The geometric proxies of each of the participants are placed in the virtual environment around the virtual table. This ensures that a viewer can see each of the participants around the virtual table. If more participants are added to the online meeting, then the virtual round table is expanded in size to a second diameter that is larger than the first diameter. The second diameter can be any diameter that is larger than the first diameter. This expansion still keeps each of the participants in view for the view and gives the illusion of being in the same room around a table with the other participants.

Embodiments of the system and method also include facilitating multiple participants at a single endpoint. In some embodiments a face tracking technique tracks two different faces and then provides different views to different viewers. In other embodiments glasses are worn by each of the multiple participants at the endpoint and in some embodiments the glasses have active shutters on them that show each wearer alternating frames displayed by the monitor that are tuned to each pair of glasses. Other embodiments use a monitor having multiple viewing angles such that a viewer looking at the monitor from the right side sees one scene and another viewer looking at the monitor from the left sees a different scene.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of controlled three-dimensional (3D) communication endpoint system and method reference is made to the accompanying drawings, which form a part thereof, and in which is shown by way of illustration a specific example whereby embodiments of the 3D communication endpoint system and method may be practiced. It is to be understood that other embodiments may be utilized and structural changes may be made without departing from the scope of the claimed subject matter.

I. System Overview

Embodiments of the controlled 3D communication endpoint system and method create a controlled capture and viewing space for immersive online conferences and meetings. Embodiments of the system and method ensure consistency at endpoints when participants are joining an online conference or meeting. The endpoint is fully controlled during the online meeting, including the lighting, room design, and geometry. Moreover, the endpoint includes the equipment for capture and viewing of the 3D immersive conference such that it appears to the viewer that the other participants are actually in the room (or same physical space) with the participant.

An endpoint is a physical location, such as a room or other type of environment, which contains at least one of the participants of the online conference or meeting. Each online conference has at least two endpoints, with each endpoint having at least one participant. Each endpoint may have two or more participants. The way to handle endpoints having two or more participants is discussed in detail below.

Figure 1:
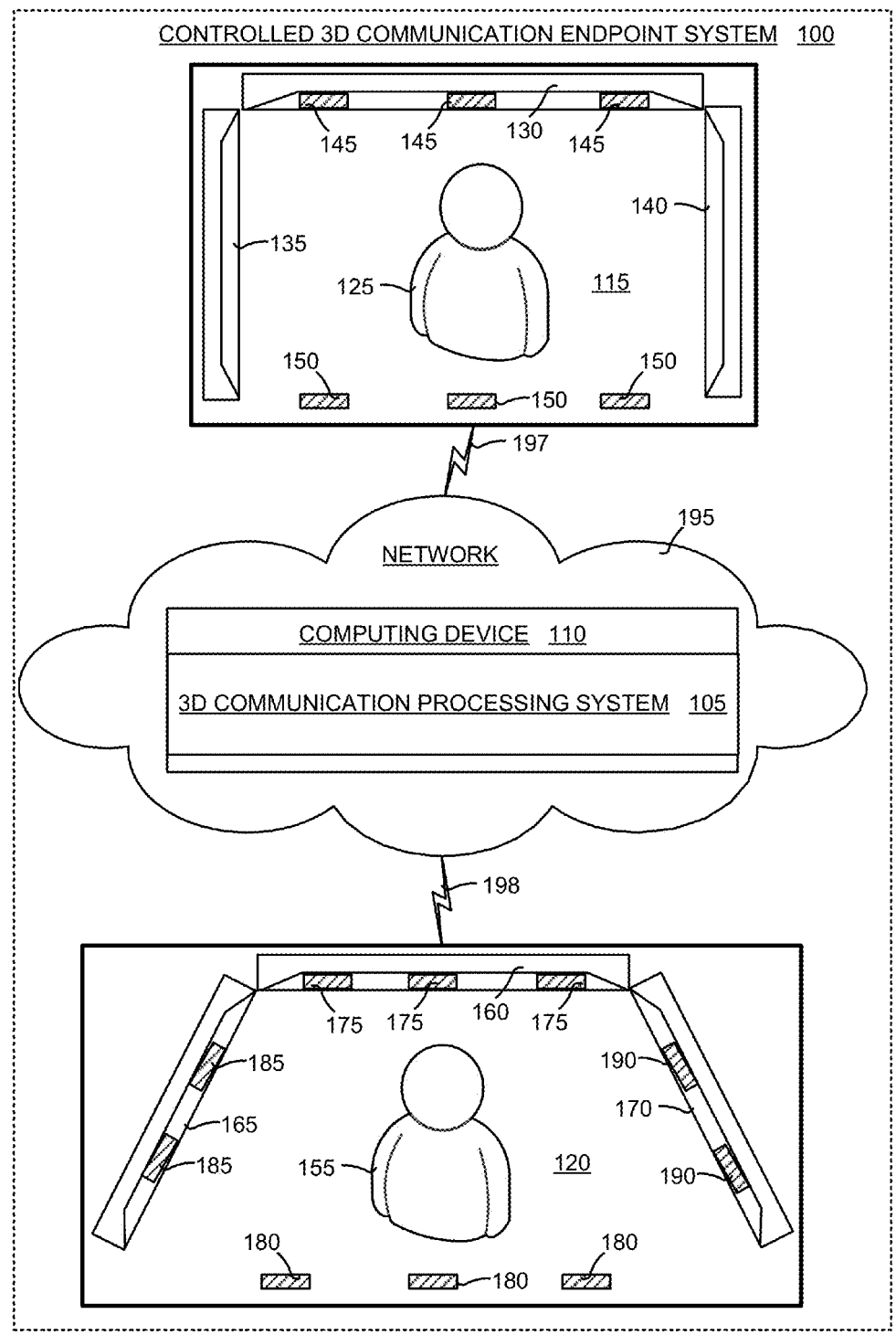
FIG. 1 is a block diagram illustrating a general overview of embodiments of the controlled three-dimensional (3D) communication endpoint system and method implemented in a computing environment.

FIG. 1 is a block diagram illustrating a general overview of embodiments of the controlled three-dimensional (3D) communication endpoint system 100 and method implemented in a computing environment. Embodiments of the system 100 and method include a variety of components and systems that work together to create an immersive experience for participants of an online meeting or conference.

As shown in FIG. 1, the system 100 and method include a 3D communication processing system 105 that facilitates the immersive experience for participants. The 3D communication processing system 105 is implemented on a computing device 110. This computing device may be a single computing device or may be spread out over a plurality of devices. Moreover, the computing device 110 may be virtually any device having a processor, including a desktop computer, a tablet computing device, and an embedded computing device.

Embodiments of the system 100 and method include at least two endpoints. For pedagogical purposes and ease of explanation FIG. 1 illustrates only two endpoints. However, it should be noted that embodiments of the system 100 and method may include several more endpoints. Moreover, although each endpoint in FIG. 1 illustrates only a single participant, it should be noted that any number of participants may be included at any endpoint.

Embodiments of the system 100 and method include a first endpoint 115 and a second endpoint 120. In FIG. 1 the first endpoint 115 and the second endpoint 120 are shown in plan view. In other words, if the first and second endpoints 115, 120 are rooms, then FIG. 1 is a plan view of the rooms.

The first endpoint 115 includes a first participant 125 contained within. The first endpoint 115 also contains a plurality of capture and viewing devices. The viewing devices at the first endpoint 115 include a first monitor 130, a second monitor 135, and a third monitor 140. The viewing devices provide the first participant 125 with an immersive experience in the online meeting such that the first participant 125 feels like he is in the room with the other participants.

Embodiments of the system 100 and method include a monitor configuration that has the monitors or screens arranged such that they are at least 180 degrees around the participant. The configuration of the monitors can be in virtually any arrangement as long as they are positioned around at least 180 degrees around the participant. As explained in detail below, this ensures that the participant's experience is fully immersive and enables scaling dependent on the number of online meeting participants.

The monitor configuration in FIG. 1 illustrates the second and third monitors 135, 140 in the first endpoint 115 at right angles to the first monitor 130. Moreover, the monitors 130, 135, 140 in the first endpoint 115 are at least 180 degrees around the first participant 125. In alternate embodiments the monitor configuration can be curved, such as in a semi-circle, or can be at less than right angles to each other.

Embodiments of the system 100 and method also include capture devices for capturing at least a portion of the first participant 125 within the first endpoint 115. Embodiments of the system 100 and method use a plurality of camera pods as capture devices. It should be noted that although six camera pods are shown in FIG. 1 fewer or more camera pods can be used.

As shown in FIG. 1 the first endpoint 115 includes a first plurality of camera pods 145 that are positioned in front of the first participant 125 and a second plurality of camera pods 150 that are positioned behind the first participant 125. The details of each camera pod are explained in detail below. FIG. 1 shows that the first plurality of camera pods 145 are attached to the first monitor 130 and that the second plurality of camera pods 150 are attached to a supporting structure of the first endpoint 115 (such as a wall in a room or on a floor of the room). However, it should be noted that in alternate embodiments the first and second plurality of camera pods 145, 150 may be mounted on some other structure or there may be some mounted on the first monitor 130 and others mounted on other structures.

The second endpoint 120 includes a second participant 155 contained within. Similar to the first endpoint 115, the second endpoint 120 also contains a plurality of capture and viewing devices. The viewing devices at the second endpoint 120 include a fourth monitor 160, a fifth monitor 165, and a sixth monitor 170. These monitors 160, 165, 170 provide the second participant 155 with an immersive experience in the online meeting such that the first participant 125 feels like he is in the room with the other participants.

The monitor configuration in FIG. 1 illustrates the fifth and sixth monitors 165, 170 in the second endpoint 120 at angles less than 90 degrees to the fourth monitor 160. Moreover, the monitors 160, 165, 170 in the second endpoint 120 are at least 180 degrees around the second participant 155. In alternate embodiments the monitor configuration also can be curved, such as in a semi-circle.

Embodiments of the system 100 and method also include capture devices for capturing at least a portion of the second participant 155 within the second endpoint 120. Embodiments of the system 100 and method use a plurality of camera pods as capture devices. It should be noted that although ten camera pods are shown in the second endpoint 120 in FIG. 1 fewer or more camera pods can be used.

As shown in FIG. 1 the second endpoint 120 includes a third plurality of camera pods 175 that are positioned in front of the second participant 155 and a fourth plurality of camera pods 180 that are positioned behind the second participant 155. The details of each camera pod are explained in detail below. Moreover, a fifth plurality of camera pods 185 is positioned on a left side of the second participant 155 and a sixth plurality of camera pods 190 is positioned on a right side of the second participant 155.

FIG. 1 shows that the third plurality of camera pods 175 are attached to the fourth monitor 160, the fifth plurality of camera pods 185 are attached to the fifth monitor 165, and the sixth plurality of camera pods 190 are attached to the sixth monitor 170. The fourth plurality of camera pods 180 are attached to a supporting structure of the second endpoint 120 (such as a wall in a room or on a floor of the room). However, it should be noted that in alternate embodiments the third, fourth, fifth, and sixth plurality of camera pods 175, 180, 185, 190 may be mounted on some other structure or there may be some mounted on other structures within the second endpoint 120.

The first participant 125 is captured by the camera pods in the first endpoint 115 and the second participant is captured by the camera pods in the second endpoint 120. This captured information then is transmitted to embodiments of the 3D communication processing system 105, as explained in detail below. The capture devices of the first endpoint 115 communicate with the 3D communication processing system 105 over a network 195. The communication between the network 195 and the first endpoint 115 is facilitated using a first communication link. Similarly, the communication between the network 195 and the second endpoint 120 is facilitated by a second communication link 198. In FIG. 1 embodiments of the 3D communication processing system 105 are shown residing on the network 195. However, it should be noted that this is only one way in which the 3D communication processing system 105 may be implemented within embodiments of the system 100 and method.

The captured information is processed and sent to the various endpoints for viewing on the monitors. Embodiments of the system 100 and method provide a virtual viewpoint to each participant at the endpoints. As explained in detail below, the virtual viewpoint allows a viewer to view the online meeting from varying perspectives dependent on the position and orientation of the viewer's face. In some embodiments face tracking is used to track the eye gaze of the viewer and determine how processed information should be presented to the viewer.

II. System Details

Embodiments of the system 100 and method include a variety of components and devices that are used together to provide participants with an immersive experience in an online meeting. The components and devices will now be discussed. It should be noted that other embodiments are possible and that other devices may be used or substituted to accomplish the purpose and function of the components and devices discussed.

Embodiments of the system 100 and method include three main components that work together to create that "in person" communications experience. The first component is capturing and creating a 3D video image of each person participating in the conference. The second component is creating the relevant scene geometry based on the number of participants in the conference. And the third component is rendering and providing a virtual view as if the camera was positioned from the perspective of where the viewer is looking, thereby recreating the same scene geometry participants would have when talking in person.

II.A. 3D Communication Processing System

Figure 2:
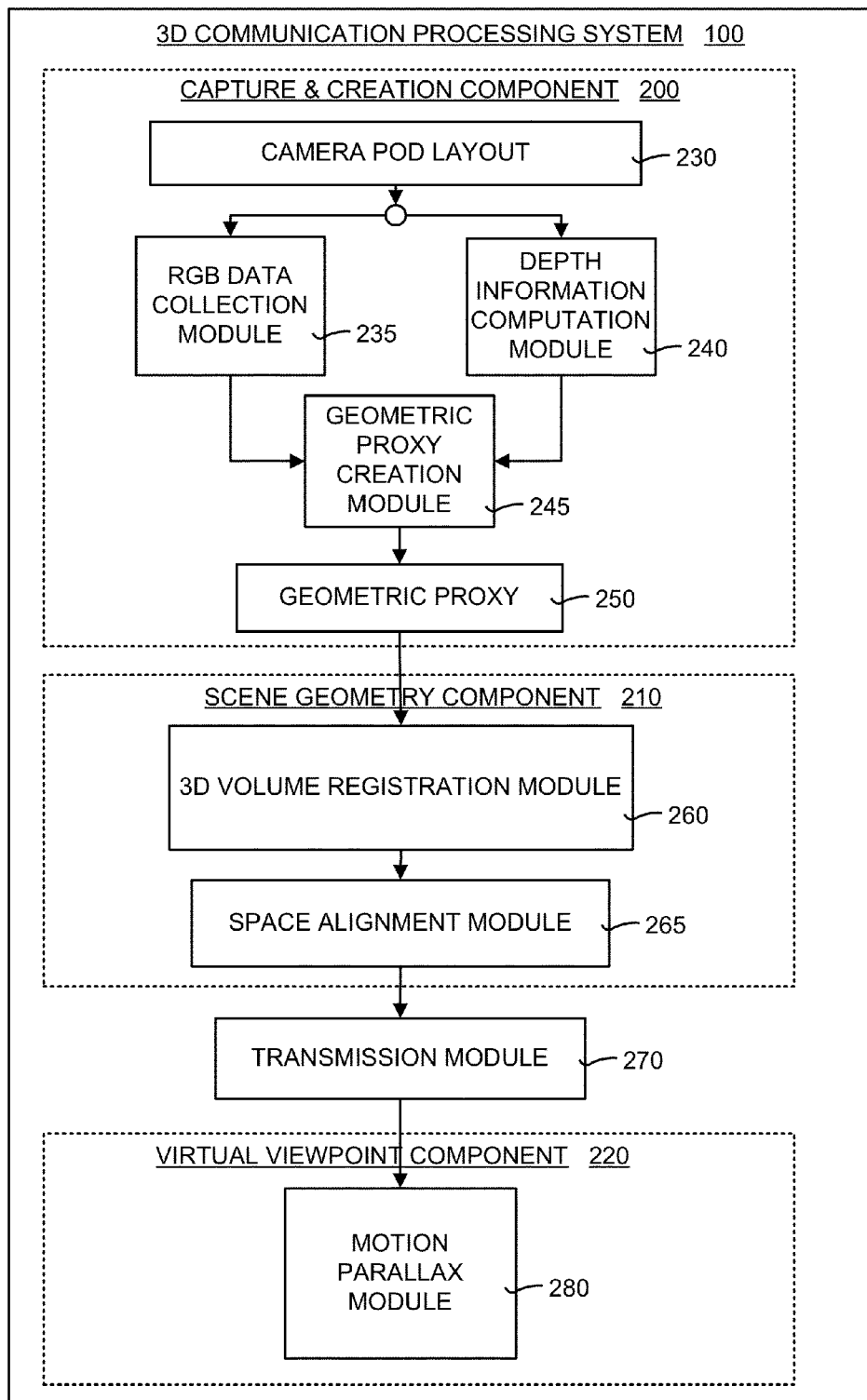
FIG. 2 is a block diagram illustrating the system details of the 3D communication processing system shown in FIG. 1.

FIG. 2 is a block diagram illustrating the system details of the 3D communication processing system 105 shown in FIG. 1. As shown in FIG. 2, the 3D communication processing system 105 includes a capture and creation component 200, a scene geometry component 210, and a virtual viewpoint component 220. The capture and creation component 200 is used for capturing and creating a 3D video image of the participant at an endpoint.

Specifically, the capture and creation component 200 includes a camera pod layout 230 that includes a plurality of camera pods. The camera pod layout 230 is used to capture a participant from multiple perspectives. Computer vision methods are used to create a high-fidelity geometry proxy for each meeting participant. As explained in detail below, this is achieved by taking RBG data obtained from an RGB data collection module 235 and depth information obtained and computed by a depth information computation module 240. From this information a geometric proxy creation module 245 creates a geometric proxy 250 for each participant. Image-based rendering methods are used to create photorealistic textures for the geometric proxy 250 such as with view-dependent texture mapping.

The scene geometry component 210 is used to create the correct scene geometry to simulate participants being together in a real conversation. This scene geometry is dependent on the number of participants in the conference. A 3D registration module 260 is used to obtain a precise registration of a display device or monitor with the camera pods. Moreover, a space alignment module 265 aligns the orientation of the camera pods with the real world. For a 1:1 meeting (having two endpoints), this is simply the two physical spaces lined up across from one another in the virtual environment. The capture area that is being recreated for each participant is the area in front of the monitor.

Once the textured geometric proxy 250 has been created for each meeting participant and the participants are represented in a 3D virtual space that is related to the other participants in the conference, the geometric proxies are rendered to each other in a manner consistent with conversational geometry. Moreover, this rendering is done based on the number of participants in the conference.

The geometric proxies and in some cases the registration and alignment information are transmitted to remote participants by the transmission module 270. The virtual viewpoint component 220 is used to enhance the virtual viewpoint rendered to the remote participants. The experience of 'being there' is enhanced through the use of a motion parallax module 280 that adds motion parallax and depth to the scene behind the participants. Horizontal and lateral movements by either participant change the viewpoint shown on their local displays and the participant sees the scene they are viewing, and the person in it, from a different perspective. This greatly enhances the experience of the meeting participants.

II.B. Camera Pod

Figure 3:
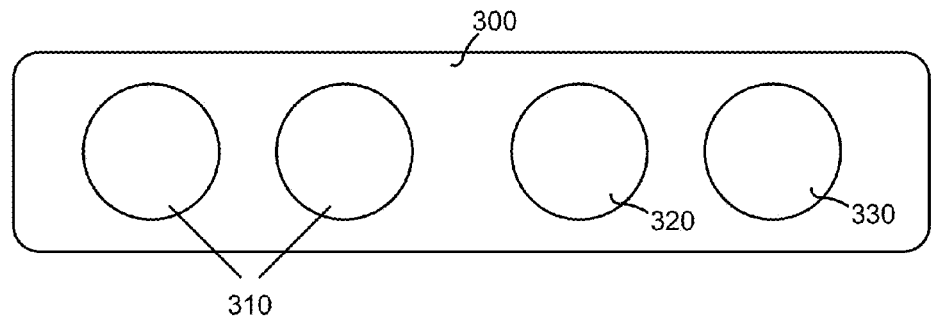
FIG. 3 is a block diagram illustrating the details of an exemplary embodiment of a camera pod of embodiments of the controlled 3D communication endpoint and method shown in FIG. 1.

As noted above, the capture and creation component 200 of the system 100 and method includes a plurality of camera pods that are used to capture participants and the scene in the endpoints. Each camera pod has a plurality of sensors. FIG. 3 is a block diagram illustrating the details of an exemplary embodiment of a camera pod 300 of embodiments of the controlled 3D communication endpoint system 100 and method shown in FIG. 1. As shown in FIG. 1, embodiments of the system 100 and method typically include more than one camera pod 300. However, for pedagogical purposes only a single camera pod will be described. Moreover, it should be noted that the multiple camera pods do not necessarily have to include the same sensors. Some embodiments of the system 100 and method may include a plurality of camera pods that contain different sensors from each other.

As shown in FIG. 3, the camera pod 300 includes multiple camera sensors. These sensors include stereoscopic sensors infrared (IR) cameras 310, an RGB camera 320, and an IR emitter 330. In order to capture a 3D image of a participant and endpoint the camera pod 300 captures RGB data and the depth coordinates in order to compute a depth map. FIG. 3 illustrates that the IR stereoscopic IR cameras 310 and the IR emitter 330 are used to capture the depth calculation. The RGB camera 320 is used for the texture acquisition and to reinforce the depth cues using depth segmentation. Depth segmentation, which is well known in the computer vision field, seeks to separate objects in an image from the background using background subtraction.

In alternative embodiments, the camera pod 300 achieves stereoscopic sensing using time of flight sensors or ultrasound instead of the IR structure light approach. A time-of-flight camera is a range imaging camera system that computes distance based on the speed of light and by measuring the time of flight of a light signal between the camera and the object for each point in an image. Ultrasound techniques can be used compute distance by generating an ultrasonic pulse in a certain direction. If there is an object in the path of the pulse, then part or all of the pulse will be reflected back to the transmitter as an echo. The range can be found by measuring the difference between the pulse being transmitted and the echo being received. In other embodiments the distance may be found be performing an RGB depth calculation using stereo pairs of RGB camera.

II.C. Camera Pod Layout

One or more camera pods are configured in a particular layout in order to capture the 3D image of endpoints that includes one or more of the participants. The number of camera pods directly affects the quality of the captured images and the number of occlusions. As the number of camera pods increases there is more RGB data available and this improves image quality. Moreover, the number of occlusions is diminished as the number of camera pods increases.

As shown in FIG. 1, the first endpoint 115 contains 6 camera pods and the second endpoint 120 contains 10 camera pods. In alternate embodiments any number of cameras may be used. In fact there could be a lower-end version that uses a single camera pod. For example, the single camera pod may be mounted on top of a monitor and use image distortion correction techniques to correct for any imaging errors. The touchstone is that the camera pod layout should have enough camera pods to provide a 3D view of the endpoint containing the participant.

Figure 4:
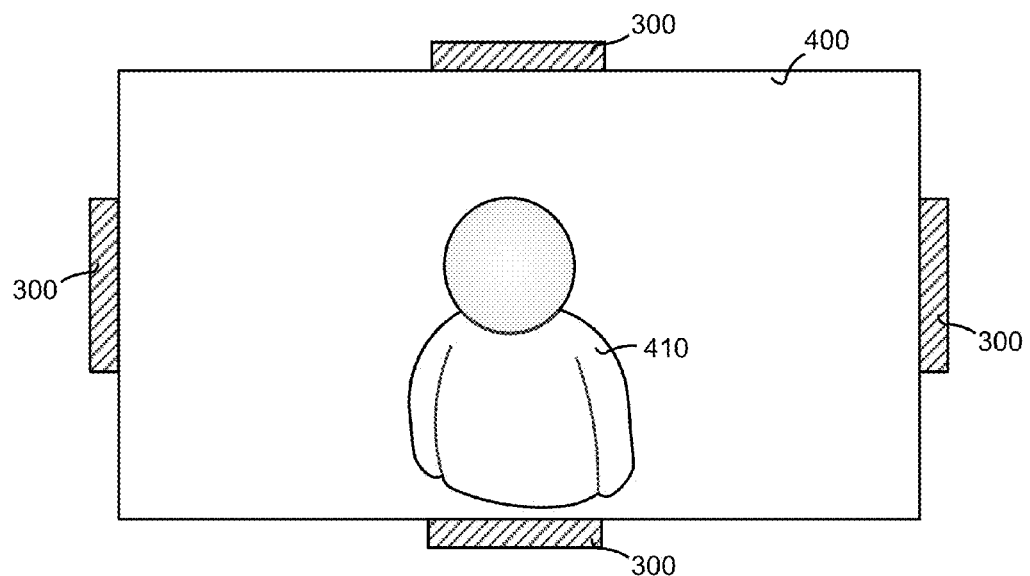
FIG. 4 illustrates an exemplary embodiment of a camera pod layout (such as that shown in FIG. 2) using four camera pods.

FIG. 4 illustrates an exemplary embodiment of a camera pod layout (such as that shown in FIG. 2) using four camera pods. As shown in FIG. 4, the four camera pods 300 are embedded in the bezel of a monitor 400. The monitor 400 can be of virtually any size, but larger monitors provide a more life-size re-projection. This typically provides the user with the more realistic experience. Displayed on the monitor 400 is a remote participant 410 that is participating in the online conference or meeting.

As shown in FIG. 4, four camera pods 300 are arranged in a diamond configuration. This allows embodiments of the system 100 and method to capture the user from above and below and from side to side. Moreover, the two middle top and bottom camera pods can be used to get a realistic texture on the face of the user without a seam. Note that cameras in the corners will typically causes a seam issue. In other embodiments virtually any configuration and arrangement of the four camera pods 300 can be used and may be mounted anywhere on the monitor 400. In still other embodiments one or more of the four camera pods 300 are mounted in places other than the monitor 400.

In alternate embodiments three camera pods are used and positioned at the top or bottom of the monitor 400. Some embodiments use two camera pods are positioned at the top or bottom corners of the monitor 400. In still other embodiments N camera pods are used, where N is greater than four (N>4). In this embodiment the N camera pods are positioned around the outside edge of the monitor 400. In yet other embodiments there are multiple camera pods positioned behind the monitor 400 in order to capture the 3D scene of the endpoint containing the participants.

II.D. Display Device Configuration

Several display devices, such as monitors and screens, are configured in a particular layout in order to display and present to each participant the captured images of at least some of the other participants. Embodiments of the system 100 and method have the display devices configured such that the arrangement surrounds at least 180 degrees of the participant in the endpoint. This ensures that embodiments of the system 100 and method can scale and provides the participants with an immersive experience. In other words, providing at least a 180-degree display device to participants in an endpoint enables them to see everyone at a virtual table at the same time. With at least a 180-degree display device, when the viewer look right and looks left around a round virtual table, she will be able to see everyone at the table.

Figure 5:
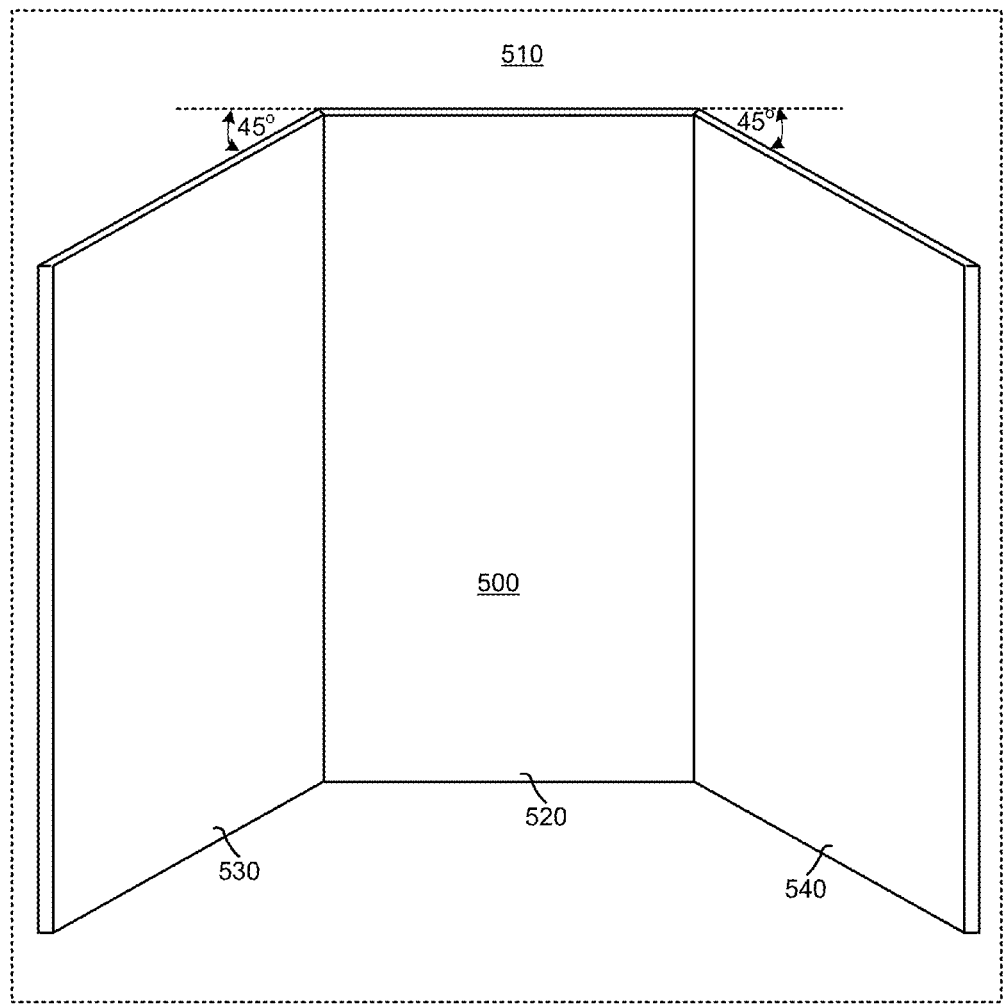
FIG. 5 illustrates an exemplary embodiment of a display device configuration (such as is shown in FIG. 1) that uses three display devices.

FIG. 5 illustrates an exemplary embodiment of a display device configuration (such as is shown in FIG. 1) that uses three display devices. As shown in FIG. 5, a display device configuration 500 is deployed in an endpoint environment 510. The display device configuration 500 includes monitor #1 520 that is positioned such that it is in front of a participant (not shown) in the endpoint environment 510. The display device configuration also includes a monitor #2 530 and a monitor #3 540 on either side of the monitor #1 520. As shown in FIG. 5 the monitor #2 530 and the monitor #3 540 are each connected or in contact with the monitor #1 520 at a 45-degree angle.

Embodiments of the system 100 and method use the endpoint environment 510 for capture and display. In some embodiments the display device configuration 500 may be in a 360-degree configuration. In other words, there may be display devices all around the participant in the endpoint environment 510. In other embodiments, the display devices may include display devices arranged to surround the endpoint environment 510 ranging anywhere from and including 180 degrees to 360 degrees. In still other embodiments the display device configuration 500 where all the walls and ceilings of the endpoint environment 510 are display devices. This type display device configuration can fully immerse the participant in a purely virtual environment.

III. Exemplary Operating Environment

Before proceeding further with the operational overview and details of embodiments of the controlled 3D communication endpoint system 100 and method, a discussion will now be presented of an exemplary operating environment in which embodiments of the controlled 3D communication endpoint system 100 and method may operate. Embodiments of the controlled 3D communication endpoint system 100 and method described herein are operational within numerous types of general purpose or special purpose computing system environments or configurations.

Figure 6:
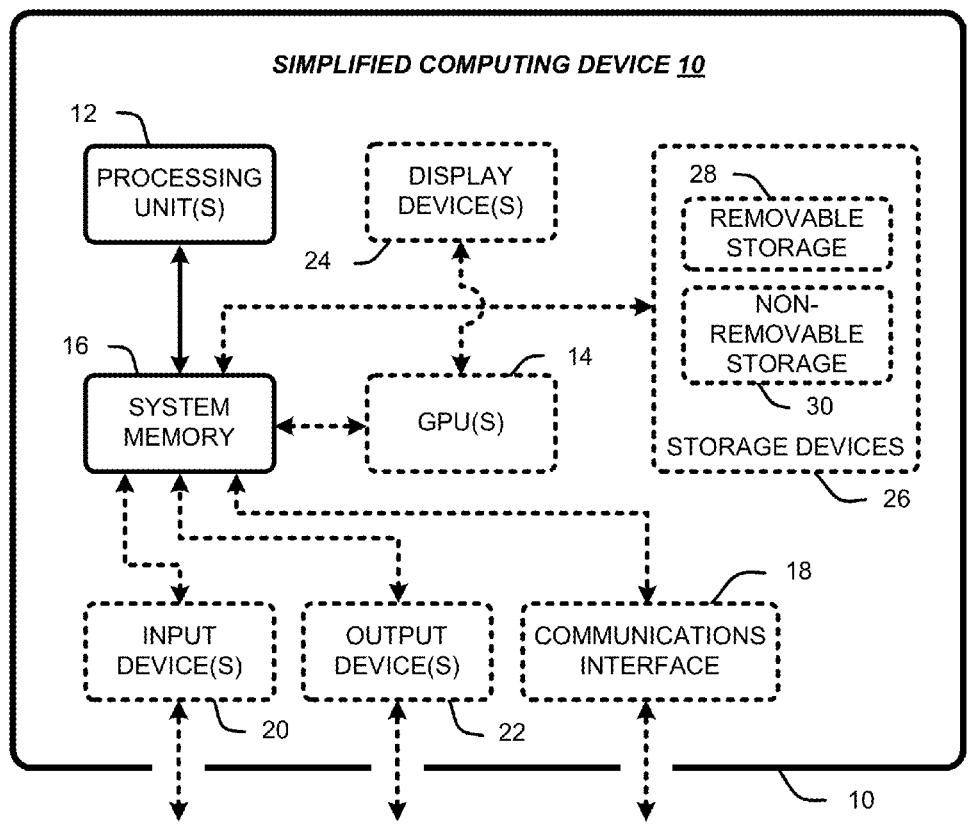
FIG. 6 illustrates a simplified example of a general-purpose computer system on which various embodiments and elements of the 3D communication window system and method, as described herein and shown in FIGS. 1-5 and 7-15, may be implemented.

FIG. 6 illustrates a simplified example of a general-purpose computer system on which various embodiments and elements of the 3D communication endpoint system 100 and method, as described herein and shown in FIGS. 1-5 and 7-15, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 10. The simplified computing device 10 may be a simplified version of the computing device 110 shown in FIG. 1. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the controlled 3D communication endpoint system 100 and method described herein, the device should have a sufficient computational capability and system memory to enable basic computational operations. In particular, as illustrated by FIG. 6, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device 10 of FIG. 6 may also include other components, such as, for example, a communications interface 18. The simplified computing device 10 of FIG. 6 may also include one or more conventional computer input devices 20 (such as styli, pointing devices, keyboards, audio input devices, video input devices, haptic input devices, devices for receiving wired or wireless data transmissions, etc.). The simplified computing device 10 of FIG. 6 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device 10 of FIG. 6 may also include a variety of computer readable media. Computer readable media can be any available media that can be accessed by the simplified computing device 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the controlled 3D communication endpoint system 100 and method described herein, or portions thereof, may be stored, received, transmitted, or read from any desired combination of computer or machine readable media or storage devices and communication media in the form of computer executable instructions or other data structures.

Finally, embodiments of the controlled 3D communication endpoint system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

IV. Operational Overview

Figure 7:
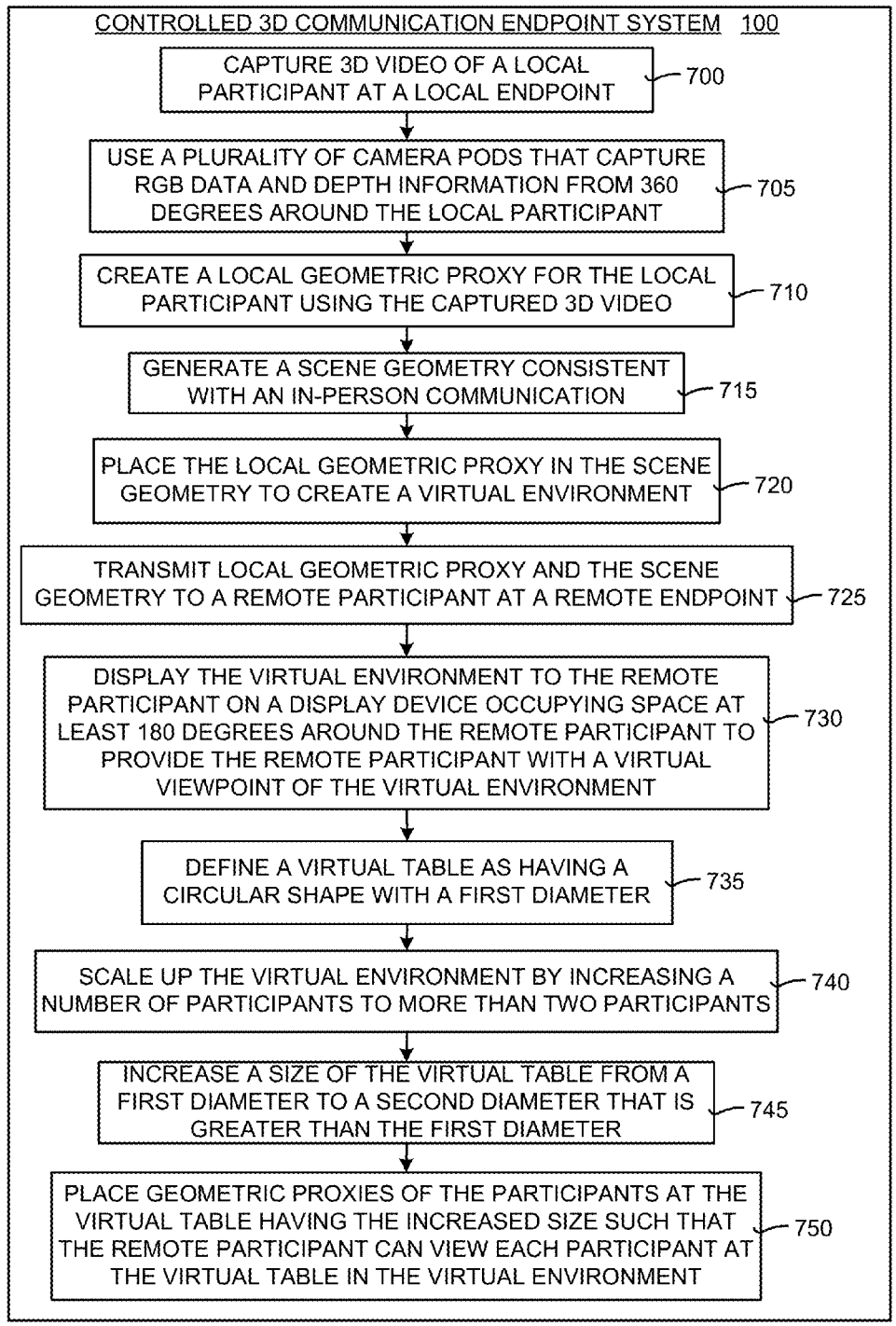
FIG. 7 is a flow diagram illustrating the general operation of the controlled 3D communication endpoint system shown in FIG. 1.

FIG. 7 is a flow diagram illustrating the general operation of the controlled 3D communication endpoint system 100 shown in FIG. 1. As shown in FIG. 7, the operation of the system 100 begins by capturing a 3D video of a local participant at a local endpoint (box 700). By way of example, the local endpoint may be a room in an office building. The captured video is obtained using a plurality of camera pods that capture both RGB data and depth information (box 705). The plurality of camera pods is positioned at 360 degrees around the local participant. In other words, the captured video contains views all the way around the local participant.

Embodiments of the method then create a local geometric proxy for the local participant using the captured 3D video (box 710). Next, the method generates a scene geometry that is consistent with an in-person communication (box 715). The general idea is to create a virtual environment that mimics the dynamics of an in-person communication. The method then places the local geometric proxy in the scene geometry to create a virtual environment (box 720). The local geometric proxy and the scene geometry are transmitted to a remote participant at a remote endpoint (box 725).

Similarly the remote participant and any other participants taking part in the online conference or meeting are captured using a plurality of camera pods and a geometric proxy is created for each of them. Each of the geometric proxies are rendered and placed in the scene geometry of the virtual environment. These rendered geometric proxies and scene geometry then are transmitted to the other participants.

The received virtual environment is displayed to a viewer (such as the remote participant) on a display device in the endpoint that occupies space that is at least 180 degrees around the remote participant (box 730). This provides the remote participant with a virtual viewpoint into the virtual environment. As explained in detail below, what a viewer sees as he looks at the virtual viewpoint depends in part on a position and orientation of the viewer's head.

Embodiments of the method define a virtual table within the virtual environment. Each of the rendered participants then is placed around the virtual table in the virtual environment. In some embodiments the virtual table has a circular shape having a first diameter (box 735). This allows scaling to easily occur. In particular, the virtual environment can be scaled up by increasing a number of participants to more than the current two participants (the local participant and the remote participant) (box 740). To accommodate this increase in participants, the method then increases a size of the virtual table from a first diameter to a second diameter, where the second diameter is greater than the first diameter (box 745). The geometric proxies of the participants are placed at the virtual table having the increased size such that the remote participant can view each participant at the virtual table in the virtual environment (box 750).

Figure 8:
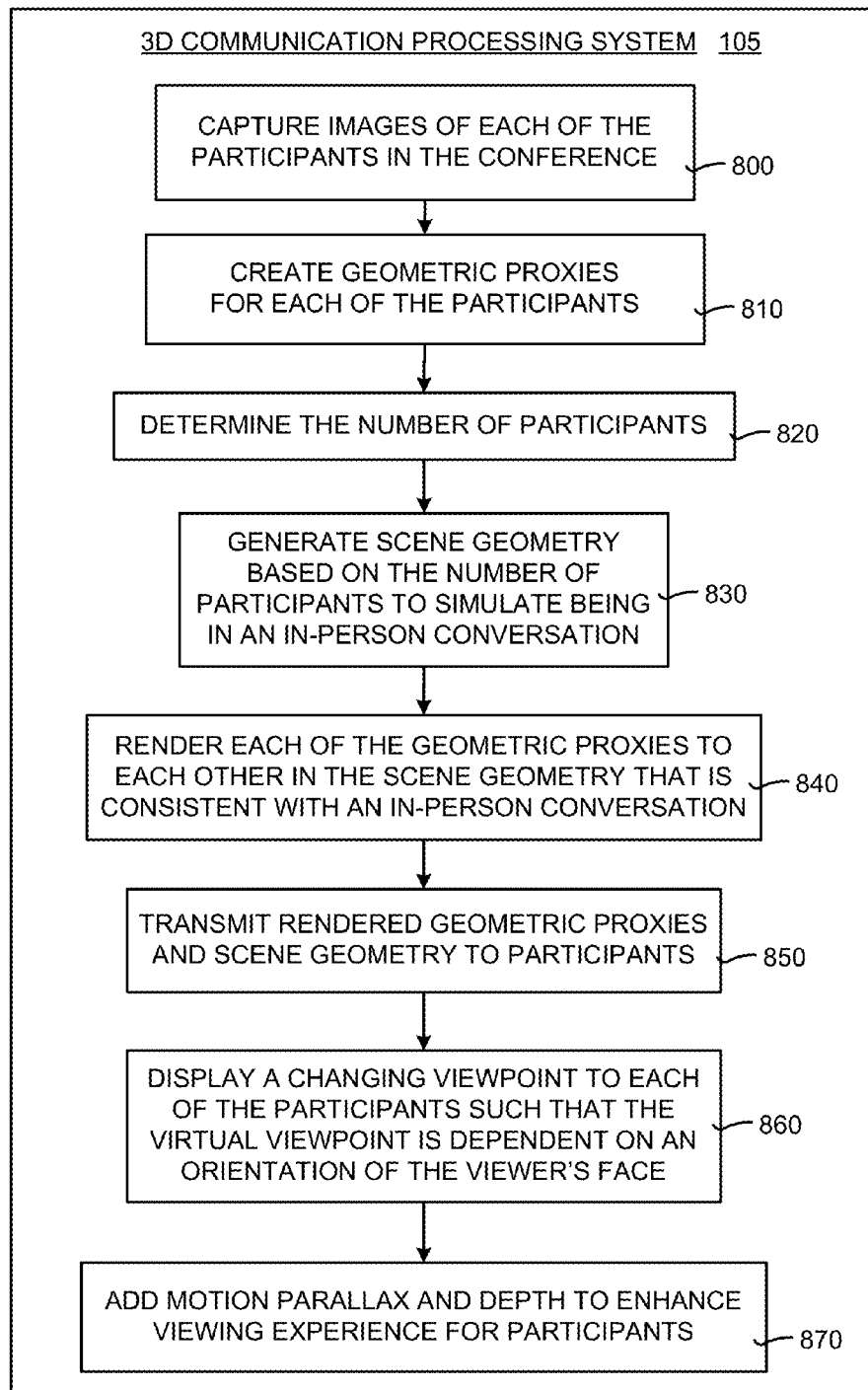
FIG. 8 is a flow diagram illustrating the general operation of the 3D communication processing system shown in FIG. 1.

Embodiments of the system 100 and method include a 3D communication processing system 105. FIG. 8 is a flow diagram illustrating the general operation of the 3D communication processing system 105 shown in FIG. 1. As shown in FIG. 8, the operation of the 3D communication processing system 105 begins by capturing images of each of the participants in the online conference or meeting (box 800). At least one of the participants is a remote participant, which means that the remote participant is not in the same physical location or endpoint as the other participant. The capture of each participant is achieved by using the camera pods.

Next, embodiments of the method use data from the captured images to create a geometric proxy for each participant (box 810). The number of participants then is determined (box 820). This determination may be performed out of order such that the number of participants is determined or known beforehand. Embodiments of the method then generate scene geometry based on the number of participants in the online meeting (box 830). This scene geometry generation helps to simulate the experience of an in-person conversation or meeting with the remote participants.

Each geometric proxy for a particular participant then is rendered to the other geometric proxies for the other participants within the scene geometry (box 840). This rendering is performed such that the geometric proxies are arranged in a manner that is consistent with an in-person conversation.

These rendered geometric proxies and the scene geometry then are transmitted to the participants (box 850). A changing virtual viewpoint is displayed to each of the participants such that the virtual viewpoint is dependent on a position and orientation of the viewer's face (box 860). For additional realism, motion parallax and depth are added in order to enhance the viewing experience for the participants (box 870). As explained in detail below, the motion parallax and depth are dependent on the eye gaze of the viewer relative to the display device or monitor on which the viewer is viewing the conference or meeting.

V. Operational Details

The operational details of embodiments of the controlled 3D communication endpoint system 100 and method will now be discussed. This includes the details of the scalability of the system 100, the geometric proxy creation, and the creation of the scene geometry. Moreover, also discussed will be the concept of a virtual camera, the addition of motion parallax and depth to the geometric proxies and scene geometry, and the handling of more than one participant in the same environment and viewing the same display device or monitor.

V.A. Scalability

Figure 9:
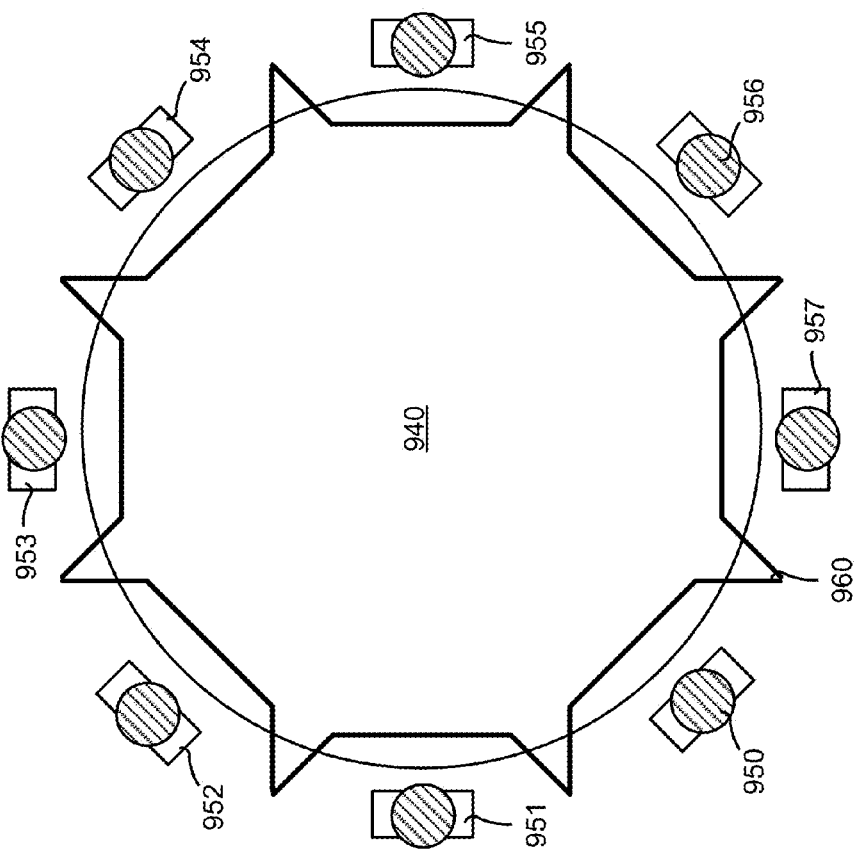
FIG. 9 illustrates an exemplary embodiment of scaling up embodiments of the system and method to accommodate additional endpoints.
Figure 9:
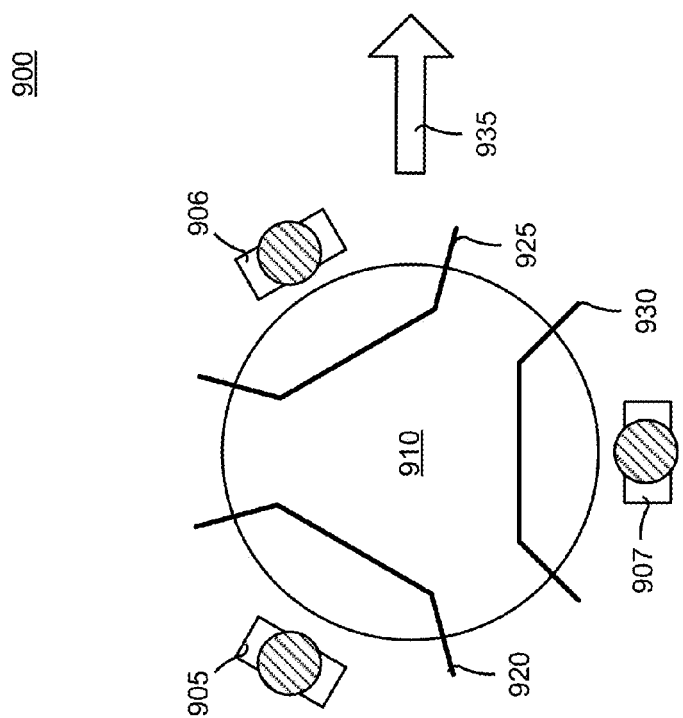

Embodiments of the controlled 3D communication endpoint system 100 and method are scalable. This means that whenever additional endpoints are added to the online meeting, embodiments of the system 100 and method can easily scale up in order to accommodate the additional endpoints. FIG. 9 illustrates an exemplary embodiment of scaling up embodiments of the system 100 and method to accommodate additional endpoints.

Because of the at least 180-degree display device configuration scalability is enhanced. For example, if a single flat screen is on the wall and there are two endpoints each having a participant, then those two participants can be placed in a virtual environment at a circular table. Each participant will able to see the other. If this is scaled up and if 10 participants at 10 endpoints try to join the online meeting, then the viewer can see people across the table from him but everyone else will be lost in the crowd. However, using an at least 180-degree display device configuration, as long as participants on the screen are in a circle in the virtual environment, then that circle can be made as big as desired and the viewer will still be able to see each of the participants.

Of course this means that the more participants that are added the bigger the virtual table needs to be. At some point the number of participants becomes so large that the participants at the farthest end of the table are so tiny that the viewer cannot recognize them. Moreover, while the virtual table does not need to be round, with other shapes there are occlusions and people start to block each other.

As shown in FIG. 9, a virtual environment 900 illustrates how embodiments of the system 100 and method arrange the geometric proxies for participants in relation to each other. On the left side of FIG. 9 three participants 905, 906, 907 are arranged around a round first virtual table 910. Each of the participants 905, 906, 907 in this virtual environments view the online meeting through a virtual window. In particular, virtual windows 920, 925, 930 are positioned in front of each of the three participants 905, 906, 907, respectively. These virtual windows 920, 925, 930 give the three participants 905, 906, 907 virtual viewpoints around the round first virtual table 910. This allows each participant to feel as if he is actually present in a room with the other participants.

The arrow 935 indicates that additional endpoints have been added to the virtual environment 900. With the addition of addition participants the round first virtual table 910 has been expanded into the round second virtual table 940. Eight participants 950, 951, 952, 953, 954, 955, 956, 957 are arranged around the round second virtual table 940. Moreover, a plurality of virtual windows 960 are positioned in front of each of the eight participants 950, 951, 952, 953, 954, 955, 956, 957. Each of the plurality of virtual windows 960 gives the participants 950, 951, 952, 953, 954, 955, 956, 957 virtual viewpoints around the round second virtual table 940. This gives each participant the illusion that each of the participants is in one large virtual room together.

V.B. Geometric Proxy Creation

Another part of the capture and creation component 200 is the geometric proxy creation module 245. The module 245 creates a geometric proxy for each of the participants in the conference or meeting. Depth information is computed from range data captured by the camera pods 300. Once the depth information is obtained a sparse point cloud is created from depth points contained in the captured depth information. A dense depth point cloud then is generated using known methods and the captured depth information. In some embodiments a mesh is constructed from the dense point cloud and the geometric proxy is generated from the mesh. In alternate embodiments the dense point clouds are textured in order to generate the geometric proxy.

Figure 10:
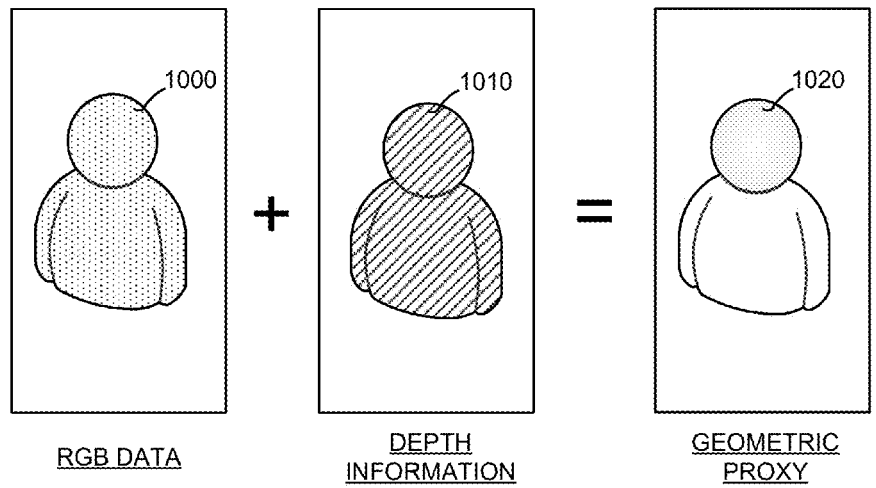
FIG. 10 illustrates an exemplary overview of the creation of a geometric proxy for a single meeting participant.

FIG. 10 illustrates an exemplary overview of the creation of a geometric proxy for a single meeting participant. As shown in FIG. 10, RGB data 1000 is captured from the RGB cameras of the camera pods 300. In addition, depth information 1010 is computed from the depth data obtained by the camera pods 300. The RGB data 1000 and the depth information 1010 are added together in order to create the geometric proxy 250 for the single meeting participant. This geometric proxy creation is performed for each of the participants such that each participant has a corresponding geometric proxy.

V.C. Registration of the 3D Volume and Alignment of the 3D Space

The second component of embodiments of the controlled 3D communication endpoint system 100 and method is the scene geometry component 210. This includes both the registration of the 3D volume and the alignment of the 3D space that the camera pods 300 capture. The general idea of the scene geometry component 210 is to create relative geometry between the meeting participants. The desire is to align the scene exactly as if the participants are in the same physical location and engaged in an in-person conversation.

Embodiments of the system 100 and method create the scene geometry that is a 3D scene anchored at the endpoint (or capturing environment). In order to achieve this it is desirable to have a precise estimation of the environments containing each of the participants. Once this is obtained then embodiments of the system 100 and method compute a precise registration of the display device (or monitor) with the cameras. This yields an orientation in virtual space that is aligned with the real world. In other words, the virtual space is aligned with the real space. This registration and alignment is achieved using known methods. In some embodiments of the system 100 and method the calibration is performed at the time of manufacture. In other embodiments calibration is performed using a reference object in the environment.

The scene geometry seeks to create relative geometry between a local participant and remote participants. This includes creating eye gaze and conversional geometry as if the participants were in an in-person meeting. One way in which to get eye gaze and conversational geometry correct is to have relative, consistent geometry between the participants. In some embodiments this is achieved by using virtual boxes. Specifically, if a box was drawn around the participants in real space when the participants are in a room together, then these virtual boxes are recreated in a virtual layout to create the scene geometry. The shape of the geometry does not matter as much as its consistency between the participants.

Certain input form factors like single monitor or multiple monitors will affect the optimum layout and scalability of the solution. The scene geometry also depends on the number of participants. A meeting with two participants (a local participant and a remote participant) is a one-to-one (1:1) scene geometry that is different from the scene geometry when there are three or more participants. Moreover, as will be seen from the examples below, the scene geometry includes eye gaze between the participants.

Figure 11:
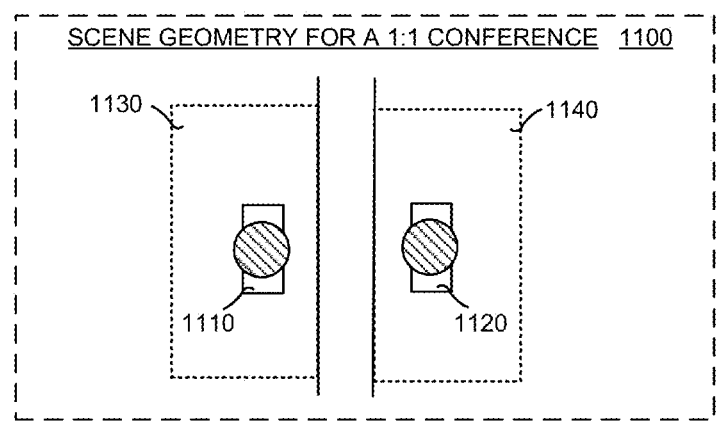
FIG. 11 illustrates an exemplary embodiment of scene geometry between participants when there are two participants (at two different endpoints) in the online meeting.

FIG. 11 illustrates an exemplary embodiment of scene geometry between participants when there are two participants (at two different endpoints) in the online meeting. As shown in FIG. 11 this scene geometry for a 1:1 conference 1100 includes a third participant 1110 and a fourth participant 1120. These participants are not in the same physical location. In other words they are at different endpoints.

In this scene geometry for a 1:1 conference 1100, the geometry consists of two boxes that occupy the spaces in front of the respective display devices or monitors (not shown) of the participants 1110, 1120. A first virtual box 1130 is drawn around the third participant 1110 and a second virtual box 1140 is drawn around the fourth participant 1120. Assuming the same size monitors and consistent setups allows embodiments of the system 100 and method to know the scene geometry is correct without any manipulation of the captured data.

Figure 12:
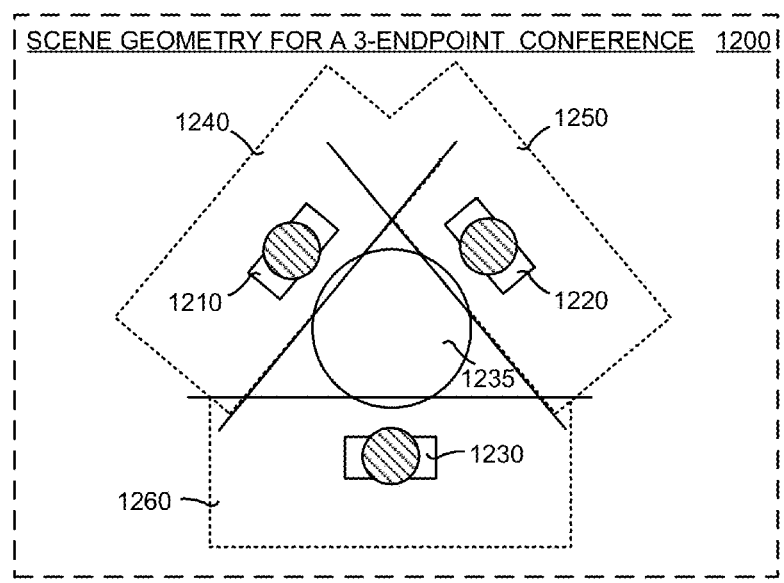
FIG. 12 illustrates an exemplary embodiment of the scene geometry between participants when there are three participants in the online meeting at three different endpoints.

In alternate embodiments of the system 100 and method there are multiple remote participants and the geometry is different from the scene geometry for a 1:1 conference 1100. FIG. 12 illustrates an exemplary embodiment of the scene geometry between participants when there are three participants in the online meeting at three different endpoints. This is the scene geometry for a 3-endpoint conference 1200. As noted above, an endpoint is an environment containing a participant of the conference or meeting. In a 3-endpoint conference there are participants in three different physical locations.

In FIG. 12 the scene geometry for a 3-endpoint conference 1200 includes participant #1 1210, participant #2 1220, and participant #3 1230 around a virtual round table 1235. A virtual box #1 1240 is drawn around participant #1 1210, a virtual box #2 1250 is drawn around participant #2 1220, and a virtual box #3 1260 is drawn around participant #3 1230. Each of the virtual boxes 1240, 1250, 1260 is placed around the virtual round table 1235 in an equidistant manner. This creates the scene geometry for a 3-endpoint conference 1200. Note that this scene geometry can be extended for additional endpoints, as discussed above with regard to scalability.

V.D. Virtual Camera

The scene geometry component 210 also includes a virtual camera. The virtual camera defines the perspective projection according to which a novel view of the 3D geometric proxy will be rendered. This allows embodiments of the system 100 and method to obtain a natural eye gaze and connection between people. One breakdown in current video conferencing occurs because people are not looking where a camera is positioned, so that the remote participants in the conference feel as though the other person is not looking at them. This is unnatural and typically does not occur in an in-person conversion.

The virtual camera in embodiments of the system 100 and method is created using the virtual space from the scene geometry and the 3D geometric proxy (having detailed texture information) for each participant. This virtual camera is not bound to the locations of the real camera pods being used to capture the images. Moreover, some embodiments of the system 100 and method use face tracking (including eye gaze tracking) to determine where the participants are and where they are looking in their virtual space. This allows a virtual camera to be created based on where a participant is looking in the scene. This serves to accurately convey the proper gaze of the participant to other participants and provides them the proper view. Thus, the virtual camera facilitates natural eye gaze and conversational geometry in the interaction between meeting participants.

These virtual cameras are created by creating a scene geometry and putting extras in that geometry. From the multiple perspectives obtained by the camera pods the virtual camera is able to move around the scene geometry. For example, if the head is thought of as a balloon, then the front of the balloon will be captured by a camera pod in front of the balloon and one side of the balloon will be captured by a camera pod on that side of the balloon. A virtual camera can be created anywhere in between the full front and the side by a composition of images from both camera pods. In other words, the virtual camera view is created as a composition of images from the different cameras covering a particular space.

Figure 13:
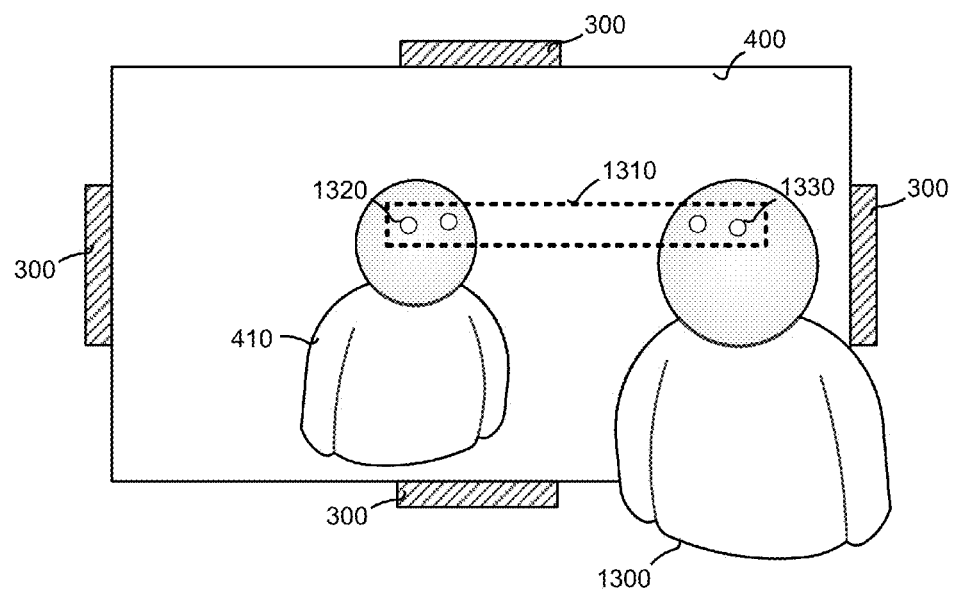
FIG. 13 illustrates an exemplary embodiment of a virtual camera based on where a participant is looking.

FIG. 13 illustrates an exemplary embodiment of a virtual camera based on where a participant is looking. This can also be thought of as using virtual gaze to obtain natural eye gaze. As shown in FIG. 13, the monitor 400 displays the remote participant 410 to a local participant 1300. The monitor 400 includes the four camera pods 300. A virtual eye gaze box 1310 is drawn around eyes of the remote participant 1320 and eyes of the local participant 1330. The virtual eye gaze box 1310 is level such that in virtual space the eyes of the remote participant 1320 and eyes of the local participant 1330 are looking at each other.

Some embodiments of the virtual camera use face tracking to improve performance. Face tracking helps embodiments of the system 100 and method change the perspective so that the participants are facing each other. Face tracking helps the virtual camera remain level with the eye gaze of the viewer. This mimics how a person's eyes work during an in-person conversation. The virtual camera interacts with the face tracking to create a virtual viewpoint that has the user looking straight at the other participant. In other words, the face tracking is used to change the virtual viewpoint of the virtual camera.

V.E. Depth Through Motion Parallax

The third component of the system 100 and method is the virtual viewpoint component 220. Once the rendered geometric proxies and scene geometry are transmitted to the participants it is rendered on the monitors of the participants. In order to add realism to the scene displayed on the monitor, depth using motion parallax is added to provide the nuanced changes in view that come when the position of someone viewing something changes.

Figure 14:
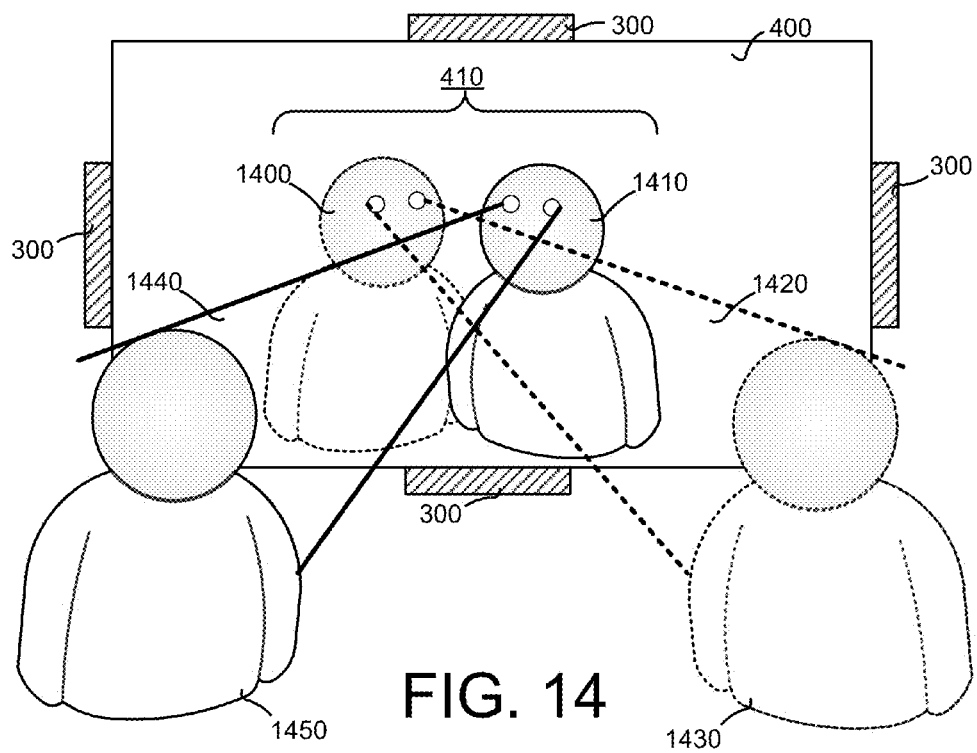
FIG. 14 illustrates an exemplary embodiment of providing depth through motion parallax based on where a viewer is facing.

Motion parallax is added using high-speed head tracking that shifts the camera view as the viewer's head moves. This creates the illusion of depth. FIG. 14 illustrates an exemplary embodiment of providing depth through motion parallax based on where a viewer is facing. As shown in FIG. 14, the monitor 400 having the four camera pods 300 displays an image of the remote participant 410. Note that in FIG. 14 the remote participant 410 is shown as a dotted-line FIG. 1400 and a solid-line FIG. 1410. The dotted-line FIG. 1410 illustrates that the remote participant 410 is looking to his left and thus has a first field-of-view 1420 that includes a dotted-line participant 1430. The solid-line FIG. 1410 illustrates that the remote participant 410 is looking to his right and thus has a second field-of-view 1440 that includes a solid-line participant 1450.

As the remote participant's 410 viewpoint moves side to side his perspective into the other space changes. This gives the remote participant 410 a different view of the other participants and the room (or environment) in which the other participants are located. Thus, if the remote participant moves left, right, up, or down he will see a slightly different view of the participant that the remote participant 410 is interacting with and the background behind that person shifts as well. This gives the scene a sense of depth and gives the people in the scene the sense of volume that they get when talking to someone in person. The remote participant's viewpoint is tracked using head tracking or a low-latency face tracking technique. Depth through motion parallax dramatically enhances the volume feel while providing full freedom of movement since the viewer is not locked to one camera perspective.

V.F. Multiple Participants at a Single Endpoint

Embodiments of the system 100 and method also include the situation where there is more than one participant at an endpoint. The above technique for depth through motion parallax works well for a single viewer because of the ability to track the viewer and to provide the appropriate view on the monitor based on their viewing angle and location. This does not work, however, if there is a second person at the same endpoint and viewing the same monitor because the monitor can only provide one scene at a time and it will be locked to one person. This causes the view to be off for the other viewer that is not being tracked.

There are several ways in which embodiments of the system 100 and method address this issue. In some embodiments monitors are used that provide different images to different viewers. In these embodiments the face tracking technique tracks two difference faces and then provides different views to different viewers. In other embodiments the motion parallax is removed and a fixed virtual camera is locked in the center of the monitor. This creates a sub-standard experience when more than one participant is at an endpoint. In still other embodiments glasses are worn by each of the multiple participants at the endpoint. Each pair of glasses is used to provide different views. In still other embodiments the glasses have active shutters on them that show each wearer different frames from the monitor. The alternating frames displayed by the monitor are tuned to each pair of glasses and provide each viewer the correct image based on the viewer's location.

Figure 15:
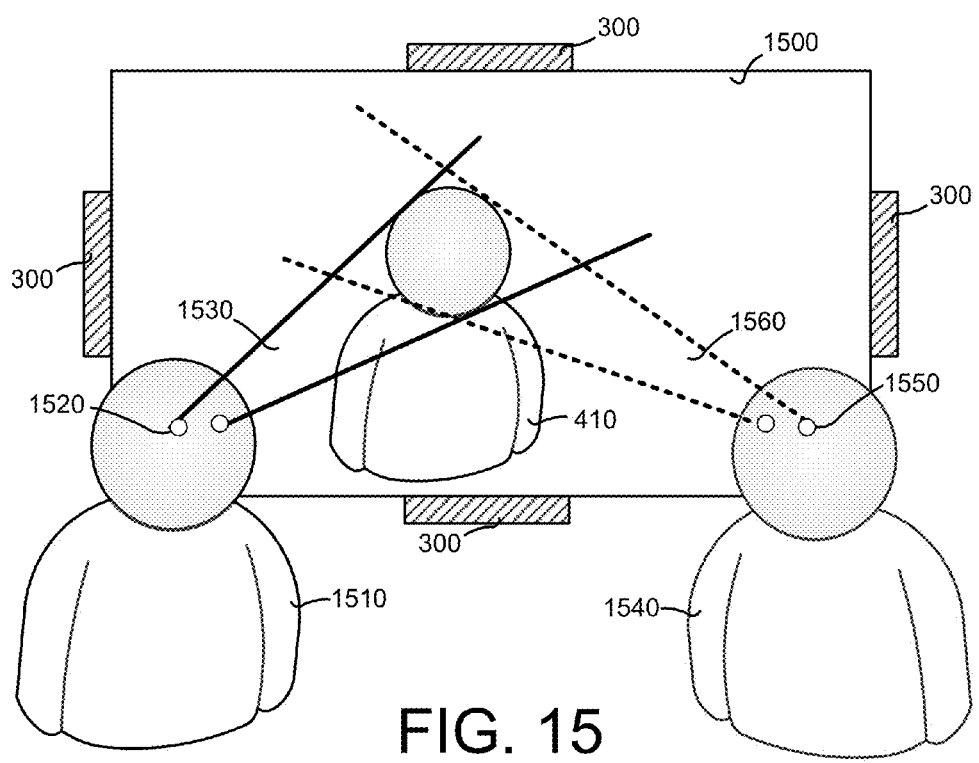
FIG. 15 illustrates an exemplary embodiment of a technique to handle multiple participants at a single endpoint using the monitor having multiple viewing angles.

Another embodiment uses a monitor having multiple viewing angles. FIG. 15 illustrates an exemplary embodiment of a technique to handle multiple participants at a single endpoint using the monitor having multiple viewing angles. This provides each viewer in front of the monitor with a different view of the remote participant 410 and the room behind the remote participant 410.

As shown in FIG. 15, a monitor 1500 having a lenticular display (which allows multiple viewing angles) and having the four camera pods 300 is displaying the remote participant 410. A first viewer 1510 is looking at the monitor 1500 from the left side of the monitor 1500. The eyes of the first viewer 1520 are looking at the monitor 1500 from the left side and have a left field-of-view 1530 of the monitor 1500. A second viewer 1540 is looking at the monitor 1500 from the right side of the monitor 1500. The eyes of the second viewer 1550 are looking at the monitor 1500 from the right side and have a right field-of-view 1560. Because of the lenticular display on the monitor 1500, the left field-of-view 1530 and the right field-of-view 1560 are different. In other words, the first viewer 1510 and the second viewer 1540 are provided with different view of the remote participant 410 and the room behind the remote participant 410. Thus, even if the first viewer 1510 and the second viewer 1540 were side by side, they would see different things on the monitor 1500 based on their viewpoint.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for simulating an in-person communication, comprising:
   capturing three-dimensional video of a local participant at a local endpoint, wherein capturing the three-dimensional video is performed in a controlled manner at the local endpoint using a plurality of camera pods that capture both RGB data and depth information about the local participant from 360 degrees around the local participant;
   creating a local geometric proxy for the local participant using the captured three-dimensional video;
   generating a scene geometry having correct eye gaze and conversational geometry consistent with an in-person communication;
   placing the local geometric proxy in the scene geometry to create a virtual environment; and
   transmitting the local geometric proxy and the scene geometry to a remote participant at a remote endpoint, wherein the local endpoint and the remote endpoint are at different physical locations to simulate an in-person communication between the local participant and the remote participant.

2. The method of claim 1, further comprising adding the RGB data and the depth information to create the local geometric proxy.

3. The method claim 1, further comprising:
   capturing a three-dimensional video of the remote participant at the remote endpoint;
   creating a remote geometric proxy for the remote participant;
   placing the remote geometric proxy in the scene geometry and virtual environment; and,
   rendering both the local geometric proxy and the remote geometric proxy to each other in the scene geometry and virtual environment.

4. The method of claim 3, further comprising transmitting the rendered local geometric proxy, the rendered remote geometric proxy, and the scene geometry to the local endpoint and the remote endpoint.

5. The method of claim 1, further comprising displaying the virtual environment to the remote participant at the remote endpoint on a display device occupying space at least 180 degrees around the remote participant to provide the remote participant with a virtual viewpoint of the virtual environment.

6. The method of claim 5, wherein the display device comprises a first display device disposed in front of the remote participant, a second display device on one side of the first display device, and a third display device on an other side of the first display device.

7. The method of claim 6, further comprising:
positioning the second display device at a right angle to the first display device; and
positioning the third display device at a right angle to the first display device.

8. The method of claim 6, further comprising:
positioning the second display device at a first angle that is less than 90 degrees to the first display device; and
positioning the third display device at a second angle that is less than 90 degrees to the first display device.

9. The method of claim 8, further comprising setting the first angle and the second angle equal to each other.

10. The method of claim 3, further comprising:
defining a virtual table in the virtual environment; and
placing the local geometric proxy and the remote geometric proxy around the virtual table to simulate the in-person communication in the virtual environment.

11. The method of claim 10, further comprising defining the virtual table as having a circular shape with a first diameter.

12. The method of claim 11, further comprising:
scaling up virtual environment by increasing a number of participants from two participants to more than two participants;
increasing a size of the virtual table from a first diameter to a second diameter, wherein the second diameter is greater than the first diameter; and
placing geometric proxies of each of the participants at the virtual table.

13. The method of claim 5, further comprising adding depth to the virtual viewpoint using motion parallax.

14. The method of claim 13, further comprising:
tracking a head of the remote participant; and
changing what is displayed to the remote participant through the virtual viewpoint based on a position and orientation of the remote participant's head.

15. A controlled three-dimensional (3D) endpoint system, comprising:
a plurality of camera pods disposed around a first endpoint to capture a 3D video of a participant at the first endpoint such that 360 degrees around the participant is captured by the plurality of camera pods;
a geometric proxy for the participant obtained by adding captured RGB data and captured depth information from the 3D video;
a scene geometry having correct eye gaze and conversational geometry consistent with an in-person communication to create a virtual environment; and
a display device configuration having a plurality of display devices situated at a second endpoint such that the display devices are placed at least 180 degrees around a viewer at the second endpoint to enable the viewer to view the participant through a virtual viewpoint, where the viewer's perspective of the participant in the virtual environment changes based on a position and orientation of the viewer's head.

16. The controlled 3D endpoint system of claim 15, further comprising:
a round virtual table positioned in the virtual environment; and
a rendered geometric proxy for the participant placed around the round virtual table along with other participants at other endpoints of an online meeting, tracking a head of the remote participant.

17. A method for scaling a number of participants in an online meeting, comprising:
organizing a controlled capture environment at endpoints having a plurality of camera pods disposed around each of the endpoints;
capturing three-dimensional video of each participant at the each endpoint using the plurality of camera pods;
creating geometric proxies for each of the participants;
generating scene geometry based on the number of participants, the scene geometry including a virtual table;
rendering each of the geometric proxies to each other in the scene geometry that is consistent with an in-person communication;
placing the rendered geometric proxies in the scene geometry around the virtual table to create a virtual environment;
organizing a controlled viewing environment at the endpoints having a display device that wraps around at least 180 degrees of the participants at the endpoints;
displaying the virtual environment to the participants in the controlled viewing environment using the display device;
changing a virtual viewpoint of participants viewing the display device based on a position and orientation of each participant's head;
increasing the number of participants such that additional participants are added; and
increasing a size of the virtual table to accommodate the additional participants.

18. The method of claim 17, further comprising defining the virtual table as a round virtual table having a diameter.

19. The method of claim 18, wherein increasing a size of the virtual table further comprises increasing the diameter of the round virtual table to accommodate the additional participants.

20. The method of claim 1, further comprising:
tracking an eye gaze of the remote participant; and
changing what is displayed to the remote participant through the virtual viewpoint based on a position and orientation of the remote participant's eye gaze.

* * * * *